US005849344A

United States Patent [19]

Eto et al.

[11] Patent Number: 5,849,344

[45] Date of Patent: Dec. 15, 1998

[54] INJECTION MOLDING APPARATUS

[75] Inventors: Yoshinari Eto; Naoki Mori; Toyokazu Yamaguchi, all of Fukuoka, Japan

[73] Assignee: Meiho Co., Ltd., Fukuoka, Japan

[21] Appl. No.: 732,222

[22] PCT Filed: Sep. 25, 1995

[86] PCT No.: PCT/JP95/01938

§ 371 Date: Oct. 25, 1996

§ 102(e) Date: Oct. 25, 1996

[87] PCT Pub. No.: WO96/09925

PCT Pub. Date: Apr. 4, 1996

[30] Foreign Application Priority Data

Sep. 28, 1994 [JP] Japan .................................... 6-271925

[51] Int. Cl.[6] ...................................................... B29C 45/23

[52] U.S. Cl. .......................... 425/556; 425/563; 425/564; 425/572

[58] Field of Search .................................... 425/552, 556, 425/563, 574, 150, 593, 572, 564

[56] References Cited

U.S. PATENT DOCUMENTS

| | | | |
|---|---|---|---|
| 2,443,826 | 6/1948 | Johnson | 425/556 |
| 3,934,626 | 1/1976 | Hall | 425/563 |
| 4,622,001 | 11/1986 | Bright et al. | 425/552 |
| 4,699,581 | 10/1987 | Nagasaka et al. | 425/574 |
| 4,988,273 | 1/1991 | Faig et al. | 425/150 |
| 5,011,399 | 4/1991 | Farrell | 425/563 |
| 5,174,942 | 12/1992 | Barnadas | 425/572 |
| 5,219,586 | 6/1993 | Yukihiro et al. | 425/572 |
| 5,332,382 | 7/1994 | Kasai et al. | 425/593 |
| 5,374,178 | 12/1994 | Nakayama | 425/564 |

FOREIGN PATENT DOCUMENTS

| | | |
|---|---|---|
| 55-139237 | 10/1980 | Japan . |
| 58-65639 | 4/1983 | Japan . |
| 5-220778 | 8/1993 | Japan . |

OTHER PUBLICATIONS

The Condensed Chemical Dictonary, p. 828, 1981.
"Injection Molding You Want to Know", Nissei Resin Injection Society, Tokyo, Japan, Machinist–sha 1986, p. 110.

*Primary Examiner*—Tim Heitbrink
*Attorney, Agent, or Firm*—Merchant, Gould, Smith, Edell Welter & Schmidt

[57] ABSTRACT

An injection molding apparatus comprising an injection unit having a plurality of injection nozzles of which respective distal end portions move back and forth between a first position and a second position, a mold clamp unit comprising a first mold clamp unit having a first frame body and an upper mold, a second mold clamp unit having a second frame body and a lower mold. A plurality of nozzle reception portions to which the distal end portions of the injection nozzles fit respectively are formed in one of the first and second frame bodies, and a resin introduction passage for introducing the molten resin from central portions of the plurality of nozzle reception portions to a plurality of cavities formed between the upper mold and lower mold as they are clamped is formed. The plurality of injection nozzles are mounted to the injection unit so as to permit the respective distal end portions to move loosely in any direction in response to an external force applied thereto.

17 Claims, 11 Drawing Sheets

INJECTION MOLDING APPARATUS

TECHNICAL FIELD

The present invention relates to an injection molding apparatus, in particular, an injection molding apparatus comprising a plurality of injection nozzles to inject a molten resin wherein the respective distal end portion of the above mentioned plurality of injection nozzles always fits to a nozzle reception portion formed on a mold clamp unit with high accuracy so as to always supply a predetermined amount of molten resin into the mold clamp unit.

BACKGROUND ART

In various industrial fields such as the electric electronic, and automobile industries, the introduction of plastic for various parts is actively conducted aiming at achieving lightweight, low cost and high added value, and advancement of injection molding technology has greatly contributed to this. This is because the injection molding technology is superior to other molding technologies in many aspects such as productivity, stability of quality, and applicability.

Speaking of a general injection molding principle briefly, it is a molding method to make a product by filling a molten resin, plasticized and kneaded by a screw in a heating cylinder (cylinder), into a cavity in a mold processed to have an optional shape at a high speed/high pressure, followed by cooling/solidification, or reaction/solidification.

As one of the major characteristics of the injection molding which are different from the other injection methods, the point that the molding cycle is a comparatively short time, and a plurality of products can be obtained in one molding cycle can be presented. The point is attributed to the fact that in the injection molding, a plurality of cavities are formed inside the mold, and a resin is filled into the above mentioned plurality of cavities during the molten resin injection at one time. However, in recent years, particularly in the injection molding aiming at the resin packaging of semiconductor chips, there is a tendency proceeding that a further improvement of the production efficiency is demanded, and the number of the products obtained in one molding cycle, that is, the number of cavities in the mold is further increased. However, the number of cavities of which inside one injection nozzle can fill with a molten resin by injecting a molten resin at one time is limited, and when the difference of the distance from a sprue to each cavity is remarkable, the degree of filling of the molded products becomes different. In order to eliminate the difference, it is preferable to arrange one injection nozzle for cavities of as small a number as possible. Therefore, recently, a resin is supplied to a plurality of cavities formed in a broad region inside the mold by using an injection unit comprising an injection nozzle having multiple heads (hereinafter abbreviated as a multi-head nozzle), that is, a plurality of injection nozzles to introduce a molten resin from a plurality of positions at the same time into a mold in the mold clamp unit.

In general, in an injection molding apparatus, a nozzle reception portion shaped to have a concave portion is formed at a position required of the frame body of a mold clamp unit comprising a mold so that the distal end portion of the injection nozzle of the injection unit fits thereto to be fixed, and with the initiation of the molding, the injection unit moves so that the distal end portion of the injection nozzle reaches the nozzle reception portion of the above mentioned mold clamp unit, and in the state where the above mentioned distal end portion fits to the nozzle reception portion a molten resin is injected from the injection opening of the above mentioned distal end portion so that the molten resin is introduced to the cavity in a mold via a resin introduction passage of which introduction orifice is formed at the center of the nozzle reception portion. In the above mentioned injection molding apparatus using the injection unit comprising the multi-head nozzle, in general, a plurality of the nozzle reception portions corresponding to respective nozzles of the above mentioned multi-head nozzle, and a plurality of resin introduction passages to introduce a molten resin from the respective nozzle reception portions to molds are formed in the frame body of the mold clamp unit.

The injection unit is for melting the resin to be molded, and injecting a predetermined amount of the molten resin as each molding cycle initiates, and thus the heating cylinder (cylinder) to conduct plasticization’kneading (melting) and the injection nozzle connected thereto are always maintained at a high temperature higher than the melting point of the resin to be molded so as to maintain the molded state of the molded resin stably. On the other hand, although the frame body on which the above mentioned nozzle reception portion and the resin introduction orifice of the mold clamp unit need to be maintained at a certain high temperature so as not to solidify the molded resin from the injection nozzle, since the temperature of the mold attached thereto needs to be maintained at a low temperature for molding, that is, for cooling’solidification of the molded resin, it is, in general, set at a temperature lower than the temperature of the above mentioned injection unit by 100°–200°C.

However, strictly speaking, if the molding cycle is implemented repeatedly, the nozzle reception portion of the frame body of the mold clamp unit is heated by the contact with the distal end portion of the injection nozzle having a higher temperature and thus the nozzle reception portion and the periphery thereof gain a gradual temperature rise. Accordingly, if the temperature rise occurs in the nozzle reception portion and the periphery thereof of the frame body of the mold clamp unit in the above mentioned injection molding apparatus using the injection unit comprising the multi-head nozzle, partial heat expansion and heat shrinkage occur in the frame body of the clamp mold unit to change the formation interval (formation pitch) of the plurality of the nozzle reception portions, preventing accurate fitting of the distal end portions of the plurality of the injection nozzles to a corresponding nozzle reception portion, as a consequence, injection openings arranged at vertices of the distal end portions of the injection nozzles and resin introduction orifices do not coincide and thus the molten resin can not be introduced to inside the mold clamp unit, or even though the injection openings and the resin introduction orifices meet, the central axes thereof do not coincide so as to allow introduction of only an amount less than a predetermined amount of the molten resin to the inside of the mold clamp unit.

The present invention was made to solve the problems, and an object thereof is to obtain an injection molding apparatus comprising an injection unit having a multi-head nozzle, that is, a plurality of injection nozzles, wherein each distal end portion of the plurality of the injection nozzles is always positioned accurately and fits to the corresponding nozzle reception portion formed on the mold clamp unit so as to always supply a predetermined amount of the molten resin to the inside of the mold clamp unit from each injection nozzle.

DISCLOSURE OF INVENTION

In order to achieve the above mentioned object, an injection molding apparatus of the present invention comprises an injection unit having a plurality of injection nozzles of which respective distal end portions move back and forth between a first position and a second position spaced therefrom by a predetermined distance by the movement of the entire unit. A molten resin is injected from an injection opening arranged at the vertex portion of the distal end portions of the above mentioned plurality of injection nozzles when the respective distal end portions of the above mentioned injection nozzles are at the above mentioned second position. The apparatus further comprises a mold clamp unit comprising a first mold clamp unit having a first frame body and an upper mold mounted on the frame body, and a second mold clamp unit having a second frame body and a lower mold mounted on the frame body. A plurality of nozzle reception portions, to which the above mentioned distal end portions of the injection nozzles fit respectively are formed in one of the above mentioned first and second frame bodies. Resin introduction passages for introducing the molten resin from the respective central portions of the plurality of the nozzle reception portions to a plurality of cavities formed between the above mentioned upper mold and lower mold in the state they are clamped are formed, when the above mentioned respective distal end portions of the plurality of injection nozzles move to the above mentioned second position when respective distal end portions of the plurality of injection nozzles are fitted and fixed to a corresponding one of the above mentioned nozzle reception portions so as to inject the molten resin from the above mentioned injection openings to the above mentioned resin introduction passage. The injection molding apparatus is characterized in that the above mentioned plurality of injection nozzles are mounted to the above mentioned injection unit so as to permit the respective distal end portions to move loosely.

In the above mentioned configuration, it is preferable that the shape of the above mentioned distal end portions is part-spherical, and the shape of the above mentioned plurality of nozzle reception portions is a part-spherical concave shape having a radius of curvature slightly larger than the radius of curvature of the above mentioned distal end portions of the injection nozzles.

Further in the above mentioned configuration, it is preferable that the above mentioned injection unit comprises a former stage portion to melt and inject a resin to be molded and a later stage portion comprising the above mentioned plurality of injection nozzles to inject the molten resin injected from the above mentioned first injection means to the outside via the above mentioned plurality of injection nozzles. It is also preferable that and the later stage portion comprises a plurality of injection nozzles where a passage for introducing a molten resin from the outside to an internal nozzle tube is formed at a first position in the longitudinal orientation thereof, and to which first and second ring-like elastic members are attached respectively at a second position on one side and a third position on the other side, spaced the same distance from the above mentioned first position in the longitudinal orientation. It is also preferable that a manifold having a plurality of cylindrical holes to allow the above mentioned plurality of injection nozzles to pass through between the upper and lower surfaces and a branch passage for carrying molten resin is formed, to communicate with each of the above mentioned plurality of cylindrical holes from a predetermined part of one side thereof. It is also preferable that each of the above mentioned plurality of injection nozzles is inserted to a corresponding hole of the above mentioned plurality of cylindrical holes of the manifold so as to have the above mentioned first and second ring-like elastic members contact to the inside of the holes, with the above mentioned distal end portions having injection holes projecting outside the above mentioned manifold to be fixed by being elastically supported from one side and the other side in the longitudinal orientation of the holes.

Further in the above mentioned configuration, it is preferable that the above mentioned later stage portion comprises a plurality of injection nozzles where a passage for introducing a molten resin from the outside to an internal nozzle tube is formed at a first position in the longitudinal orientation thereof. It is also preferable that first and second ring-like elastic members are attached respectively at a second position on one side and a third position on the other side, spaced the same distance from the above mentioned first position in the longitudinal orientation. It is also preferable that the above-mentioned later stage portion comprises a manifold main body having a plurality of cylindrical holes to allow the above mentioned plurality of injection nozzles to pass through between the upper and lower surfaces, and a branch passage for carrying molten resin formed to communicate with each of the above mentioned plurality of cylindrical holes from a predetermined part of one side thereof. It is also preferable that the above-mentioned later stage portion comprises a first plate-like body, in which a plurality of through holes to join corresponding holes among the above mentioned plurality of cylindrical holes formed in the above mentioned manifold main body are formed to be attached removably to the upper surface of the above mentioned manifold main body, a second plate-like body, in which a plurality of through holes having an aperture area smaller than the aperture area of a corresponding hole among the above mentioned plurality of through holes formed in the above mentioned manifold main body to be attached removably to the lower surface of the above mentioned manifold main body. It is also preferable that the above-mentioned later stage portion comprises a plurality of columnar screws to respectively thread to the above mentioned plurality of through holes of the above mentioned first plate-like body, and a plurality of spring members arranged respectively in a plurality of spaces formed with the above mentioned plurality of columnar holes of the above mentioned manifold main body and the above mentioned plurality of through holes of the first plate-like body and intervening between the above mentioned columnar screws and the rear end portions of the injection nozzles to contact to press the above mentioned rear end portions of the injection nozzles.

Further, in the above mentioned configuration, it is preferable that the above mentioned former stage portion comprises screw preplasticating injection means comprising a screw type melting and kneading means where a resin thrown into a hopper is introduced to the inside of a heated cylinder and melted and kneaded by a screw in the cylinder. It is also preferable that the above-mentioned former stage portion comprises and an injection dedicated means to store a predetermined amount of the resin melted and kneaded by the screw type melting and kneading means in a space in the front portion of an injection plunger and inject by the injection plunger.

Further, in the above mentioned configuration, it is preferable that the above mentioned mold clamp unit designed to have the above mentioned second mold clamp unit is fixed and arranged on a working table. It is also preferable that the above mentioned upper mold and lower mold opens and closes in the upward and downward directions by movement in the upward and downward directions of the first mold clamp unit above the second mold clamp unit. It is also preferable that the above mentioned injection unit comprises a former stage portion to melt and inject a resin to be molded, the above mentioned plurality of injection nozzles, and a later stage portion to inject the molten resin injected from the above mentioned first injeciton means to the outside via the above mentioned plurality of injection nozzles. It is also preferable that the entire unit is designed to move in the upward and downward directions so that the respective distal end portions of the above mentioned plurality of injection nozzles fit to a corresponding one among the above mentioned plurality of nozzle reception portions formed in the above mentioned first frame body of the above mentioned mold clamp unit. It is also preferable that the above mentioned former stage portion is a screw preplasticating injection means comprising a screw type melting and kneading means where a resin thrown into a hopper is introduced to the inside of a heated cylinder and melted and kneaded by a screw in the cylinder, and an injection dedicated means to store a predetermined amount of the resin melted and kneaded by the screw type melting and kneading means in a space in the front portion of an injection plunger and inject by the injection plunger, and is connected to the side portion of the above mentioned later stage portion to be arranged parallel with respect to the upper surface of the above mentioned working table.

Further, in the above mentioned configuration, it is preferable that the above mentioned screw preplasticating injection means has the above mentioned screw type melting and kneading means and the above mentioned injection dedicated means are connected so as to form a V-shape horizontally in a position at the same level with respect to the upper surface of the working table.

Further, in the above mentioned configuration, it is preferable that the above mentioned plurality of nozzle reception portions to which the distal end portions of the plurality of injection nozzles fit formed on either one of the above mentioned first and second frame bodies of the above mentioned mold clamp unit are formed in a position in the vicinity of the above mentioned plurality of cavities formed between the upper mold and the lower mold of the above mentioned first or second frame body, and the above mentioned plurality of injection nozzles of the injection unit are extension nozzles.

Further in the above mentioned configuration, it is preferable that a shut-off valve for opening and closing the above mentioned injection opening is arranged in the above mentioned plurality of injection nozzles.

Further, in the above mentioned configuration, it is preferable that the above mentioned mold clamp unit is for conducting an insert molding of electric'electronic parts in the above mentioned plurality of cavities, and eject pins are arranged in the above mentioned first frame body for pressing the above mentioned metallic parts toward the surface of the abov e mentioned lower mold via the above mentioned through hole formed in the above mentioned upper mold at the time of mold opening after terminating the above mentioned clamping.

Further, in the above mentioned configuration, it is preferable that the above mentioned electric'electronic parts are semiconductor chips, the metallic parts are lead frames, and the above mentioned insert molding of the electric'electronic parts is a packaging of the semiconductor chips.

Further in the above mentioned configuration, it is preferable that the above mentioned resin introduction orifice formed in either one of the above mentioned first and second frame bodies comprises a plurality of sprues of which introduction orifices are arranged at the respective center point of the above mentioned plurality of nozzle reception portions formed in either one of the above mentioned first and second frame bodies, and a runner for connecting the plurality of sprues and the above mentioned plurality of cavities so that the resin can be supplied from each one of the plurality of sprues to at least 2 or more cavities.

Further, in the above mentioned configuration, it is preferable that the above mentioned elastic members are formed using at least one selected from the group consisting of polyimide, polybenzimidazble, polyether nitrile, polyether ketone, polyketone sulfide, polyether sulfone and ester cyanide resin, or one provided by covering an elastic member mainly comprising an asbestoes with a metallic fiber.

Further, in the above mentioned configuration, it is preferable that the above mentioned molten resin is a thermoplastic resin.

Further, in the above mentioned configuration, it is preferable that the above mentioned thermoplastic resin is polyphenylene sulfide or polymethyl penten.

Further, in the above mentioned configuration, it is preferable that the drive of the above mentioned injection unit and the drive of the above mentioned mold clamp unit are an electrically-driven servo motor drive.

According to the above, an injection molding apparatus of the present invention comprises an injection unit having a plurality of injection nozzles of which respective distal end portions move back and forth between a first portion and a second position spaced therefrom by a predetermined distance by the movement of the entire unit. A molten resin is injected from an injection opening arranged at the vertex portion of the distal end portion of the above mentioned plurality of injection nozzles when the respective distal end portions of the above mentioned injection nozzles are at the above mentioned second position. The apparatus further comprises a first mold clamp unit having a first frame body and an upper mold mounted on the frame body, and a second mold clamp unit having a second frame body and a lower mold mounted on the frame body. A plurality of nozzle reception portions, to which the above mentioned distal end portions of the injection nozzles fit respectively, are formed in one of the above mentioned first and second frame bodies. The apparatus further comprises a mold clamp unit in which a resin introduction passage for introducing the molten resin from the respective central portions of the plurality of the nozzle reception portions to a plurality of cavities formed between the above mentioned upper mold and lower mold in the state they are clamped is formed, when the above mentioned respective distal end portions of the plurality of injection nozzles move to the above mentioned second position the respective distal end portions of the plurality of injection nozzles are fitted and fixed to a corresponding one of the above mentioned nozzle reception portions so as to inject the molten resin from the above mentioned injection openings to the above mentioned resin introduction passage. The injection molding apparatus is characterized in that the above mentioned plurality of injection nozzles are mounted to the above mentioned injection unit so as to permit the respective distal end portions to move loosely, even when the formation interval (formation pitch) of the plurality of the nozzle reception portions changes by heat expansion or heat shrinkage caused by the temperature change of the frame body of the mold clamp unit. The apparatus is further characterized in that the respective distal end portions of the plurality of the injection nozzles contact to the corresponding nozzle reception portions without coinciding with each other's center positions, by the loose movement of the distal end portions of the nozzles. The apparatus is further characterized in that the distal end portions of the nozzles move along the surface of the nozzle reception portions to fit in the most natural fitting state, that is, in the fitting state where the central axes of the injection holes existing at the vertices of the distal end portions of the nozzles and the central axes of the resin introduction orifices existing at the centers of the nozzle reception portions coincide. Accordingly, regardless of the change of the formation interval (formation pitch) of the plurality of the nozzle reception portions formed in the frame body of the mold clamp unit, the plurality of the injection nozzles supply a predetermined amount of the molten resin to the inside of the mold clamp unit respectively.

Further, as a preferable example of the above mentioned configuration, the shape of the above mentioned distal end portions is part-spherical, and the shape of the above mentioned plurality of nozzle reception portions is a part-spherical concave shape having a radius of curvature slightly larger than the radius of curvature of the above mentioned distal end portions of the injection nozzles, the insertion of the distal end portions of the injection nozzles to the corresponding nozzle reception portions can be conducted easily even in the case when the amount of the change of the formation interval (formation pitch) of the plurality of the nozzle reception portion is large, and thus the reliability of the apparatus further improves.

Further, as a preferable example of the above mentioned configuration, the above mentioned injection unit comprises a former stage portion to melt and inject a resin to be molded and a later stage portion comprising the above mentioned plurality of injection nozzles to inject the molten resin injected from the above mentioned first injection means to the outside via the above mentioned plurality of injection nozzles, and the later stage portion has a passage for introducing a molten resin from the outside to an internal nozzle tube formed at a first position in the longitudinal orientation thereof comprises a plurality of injection nozzles and comprises a plurality of injection nozzles to which a first and second ring-like elastic members are attached respectively at a second position on one side and a third position on the other side spaced the same distance from the above mentioned first position in the longitudinal orientation, a plurality of cylindrical holes to allow the above mentioned plurality of injection nozzles to pass through between the upper and lower surfaces, and a manifold having a branch passage for carrying molten resin formed to communicate with each of the above mentioned plurality of cylindrical holes from a predetermined part of one side thereof, wherein each of the above mentioned plurality of injection nozzles is inserted into a corresponding hole of the above mentioned plurality of cylindrical holes of the manifold so as to have the above mentioned first and second ring-like elastic members contact to the inside of the holes and the above mentioned distal end portions having injection holes project outside the above mentioned manifold to be fixed by being elastically supported from one side and the other side in the longitudinal orientation of the holes, the above mentioned later stage portion has each of the plurality of the injection nozzles mounted individually and accurately with the distal end portions capable of free loose movement, and the assembling operation thereof can be conducted easily.

Further, as a preferable example of the above mentioned configuration, the above mentioned later stage portion has a passage for introducing a molten resin from the outside to an internal nozzle tube formed at the first position in the longitudinal orientation thereof. The later stage portion further comprises a plurality of injection nozzles to which first and second ring-like elastic members are attached respectively at a second position on one side and a third position on the other side spaced the same distance from the above mentioned first position in the longitudinal orientation. The later stage portion further comprises a plurality of cylindrical holes to allow the above mentioned plurality of injection nozzles to pass through between the upper and lower surfaces, and a manifold main body having a branch passage for carrying molten resin formed to communicate with each of the above mentioned plurality of cylindrical holes from a predetermined part of one side thereof. The later stage portion further comprises a first plate-like body in which a plurality of through holes to join a corresponding hole among the above mentioned plurality of cylindrical holes formed in the above mentioned manifold main body are formed to be attached removably to the upper surface of the above mentioned manifold main body. The later stage portion further comprises a second plate-like body in which a plurality of through holes having an aperture area smaller than the aperture area of a corresponding hole among the above mentioned plurality of through holes formed in the above mentioned manifold main body to be attached removably to the lower surface of the above mentioned manifold main body. The later stage portion further comprises a plurality of columnar screws to respectively thread to the above mentioned plurality of through holes of the above mentioned first plate-like body. The later stage portion further comprises a plurality of spring members arranged respectively in a plurality of spaces formed by the above mentioned plurality of columnar holes of the above mentioned manifold main body and the above mentioned plurality of through holes of the first plate-like body and intervening between the above mentioned columnar screws and the rear end portions of the injection nozzles to contact to press the above mentioned rear end portions of the injection nozzles. The above mentioned later stage portion has each of the plurality of the injection nozzles mounted individually and accurately with the distal end portions being capable of free loose movement, and also the assembling operation thereof can be conducted easily and maintenance including replacement of each parts and cleaning can be conducted easily.

Further, as a preferable example of the above mentioned configuration, the above mentioned former stage portion is a screw preplasticating injection means comprising a screw type melting and kneading means where a resin thrown into a hopper is introduced to the inside of a heated cylinder and melted and kneaded by a screw in the cylinder, and an injection dedicated means to store a predetermined amount of the resin melted and kneaded by the screw type melting and kneading means in a space in the front portion of an injection plunger and inject by the injection plunger, a large amount of resin to be injected can be accurately measured and injected, and thus the weight variation of the molded products obtained in each cycle can be reduced in implementing repeating molding cycles, improving the production yield.

Further, as a preferable example of the above mentioned configuration, the above mentioned mold clamp unit is designed to have the above mentioned second mold clamp unit is fixed and arranged on a working table and the above mentioned upper mold and lower mold open and close in the upward and downward directions by the movement in the upward and downward directions of the first mold clamp unit above the above mentioned second mold clamp unit, the above mentioned injection unit comprises a former stage portion to melt and inject a resin to be molded and the above mentioned plurality of injection nozzles and has a later stage portion to inject the molten resin injected from the above mentioned first injection means to the outside via the above mentioned plurality of injection nozzles, and the entire unit is designed to move in the upward and downward directions so that the respective distal end portions of the above mentioned plurality of injection nozzles fit to a corresponding one among the above mentioned plurality of nozzle reception portions formed in the above mentioned first frame body of the above mentioned mold clamp unit, and the above mentioned former stage portion is a screw preplasticizing injection means comprising a screw type melting and kneading means where a resin thrown into a hopper is introduced to the inside of a heated cylinder and melted and kneaded by a screw in the cylinder, and an injection dedicated means to store a predetermined amount of the resin melted and kneaded by the screw type melting and kneading means in a space in the front portion of an injection plunger and inject by the injection plunger, and is connected to the side portion of the above mentioned later stage portion to be arranged parallel with respect to the upper surface of the above mentioned working table, since a large amount of resin to be injected can be accurately measured and injected similar to the above mentioned, the production yield can be improved and since the upper mold and the lower mold open and close in the upward and downward directions, fixation of the parts can be conducted easily in the insert molding where the injection molding is conducted with the metallic parts inserted, besides, since the entire apparatus forms an L-shape, the occupied height of the apparatus can be reduced.

Further, as a preferable example of the above mentioned configuration, the above mentioned screw preplasticizing injection means has the above mentioned screw type melting and kneading means and the above mentioned injection dedicated means are connected so as to form a V-shape in a position at the same level with respect to the upper surface of the above mentioned working table, since the distance between the above mentioned hopper to throw in the material of the screw type melting and kneading means and the above mentioned injection dedicated means is prolonged, the operation to throw in the resin material into the hopper can be facilitated. Besides, since the other means does not disturb in the maintenance operation of one means, the operativity of the maintenance operation improves.

Further, as a preferable example of the above mentioned configuration, the above mentioned plurality of nozzle reception portions to which the distal end portions of the plurality of injection nozzles fit, which are formed on either one of the above mentioned first and second frame bodies of the above mentioned mold clamp unit, are formed in a position in the vicinity of the above mentioned plurality of cavities formed between the upper mold and the lower mold of the above mentioned first or second frame body, and the above mentioned plurality of injection nozzles of the injection unit are extension nozzles, the molten resin can be filled in the cavity while preventing the solidification of the injected molten resin securely, and thus the production yield can be improved.

Further, as a preferable example of the above mentioned configuration, a shut-off valve for opening and closing the above mentioned injection opening is arranged in the above mentioned plurality of injection nozzles, the leakage from the nozzle of the molten resin remaining in the nozzle at the time of mold opening after finishing the molding can be eliminated, so as to eliminate the phenomena that deteriorate the operativity of the molding operation such as drooling and stringiness, and thus the operation efficiency of the molding apparatus can be improved.

Further, as a preferable example of the above mentioned configuration, the above mentioned mold clamp unit is for conducting an insert molding of electric'electronic parts in the above mentioned plurality of cavities, and an eject pin is arranged in the above mentioned first frame body for pressing the above mentioned metallic parts to the surface of the above mentioned lower mold via the above mentioned through hole formed in the above mentioned upper mold at the time of mold opening after terminating the above mentioned clamping, the molded products can be taken out without deforming the metallic parts securely and thus molded products with a high reliability can be obtained with a good reproductivity. In particular, in the case when the metallic parts are lead frames and the packaging of the semiconductor chips is conducted by the insert molding, since lead frames are liable to deformation, it is useful.

Further, as a preferable example of the above mentioned configuration, the above mentioned resin introduction orifice formed in either one of the above mentioned first and second frame bodies comprises a plurality of sprues of which introduction orifices are arranged at the respective center point of the above mentioned plurality of nozzle reception portions formed in either one of the above mentioned first and second frame bodies, and a runner for connecting the plurality of sprues and the above mentioned plurality of cavities so that the resin can be supplied from each one of the plurality of sprues to at least 2 or more cavities, the resin filling amount and the resin filling speed of the plurality of the cavities among cavities to each other can be uniform and thus a plurality of molded products having uniform characteristics can be obtained securely in one molding cycle.

Further, as a preferable example of the above mentioned configuration, the above mentioned elastic members are formed using at least one selected from the group consisting of polyimide, polybenzimidazole, polyether nitrile, polyether ketone, polyketone sulfide, polyether sulfone and ester cyanide resin, or one provided by covering an elastic member mainly comprising an asbestoes with a metallic fiber, the above mentioned elastic members can maintain their elasticity at a high temperature of 300° C. or higher and thus the injection nozzles can be supported stably with the distal end portions moving loosely over a long period.

Further, as a preferable example of the above mentioned configuration, the above mentioned molten resin is a thermoplastic resin, since after being filled into the cavities the molten resin can be cooled down by the mold to solidify in short time, one molding cycle can be shortened so that molded products can be obtained with a high production efficiency. Further, since resin solidified at a sprue, a runner and a gate to be discarded after molding can be reused, it is advantageous in terms of economy. Further, since waste can be reduced, it is advantageous in terms of environmental concern.

Further, as a preferable example of the above mentioned configuration, the above mentioned thermoplastic resin is polyphenylene sulfide or polymethyl penten, since an excellent fluidity can be provided in the molten state, poor filling of the resin into a cavity can be alleviated in the case of conducting molding when a large mold or a mold having a number of cavities is used. Further, by the excellent fluidity, the deformation of the extra-fine wires to bond the elements and leads can be restrained in the encapsulation molding of a semiconductor element. Further, since the molding shrinkage is small and the heat resistance and electric insulation are excellent, in particular, transparency is also excellent in polymethyl penten, for example, in encapsulation molding of an optical semiconductor element such as a light emitting diode, a photo diode and a photo transistor, molded products with a small characteristic deterioration of the optical semiconductor element and high reliability can be obtained.

Further, as a preferable example of the above mentioned configuration, the drive of the above mentioned injection unit and the drive of the above mentioned mold clamp unit are an electrically-driven servo motor drive, high accuracy and high speed control can be realized and excellent quietness and cleanliness can be provided so that the apparatus can be operated in a clean room.

BRIEF DESCRIPTION OF DRAWINGS

FIG. 1 illustrates the state of initiating injection after clamping,

FIG. 2 illustrates the state of mold opening of the upper mold and the lower mold after terminating the injection'pressure dwelling, and FIG. 3 illustrates the state of ejecting the molded product from the lower mold after mold opening, respectively;

BEST MODE FOR CARRYING OUT THE INVENTION

Hereinafter the present invention will be further explained concretely using examples.

(EXAMPLE 1)

Figure 1:
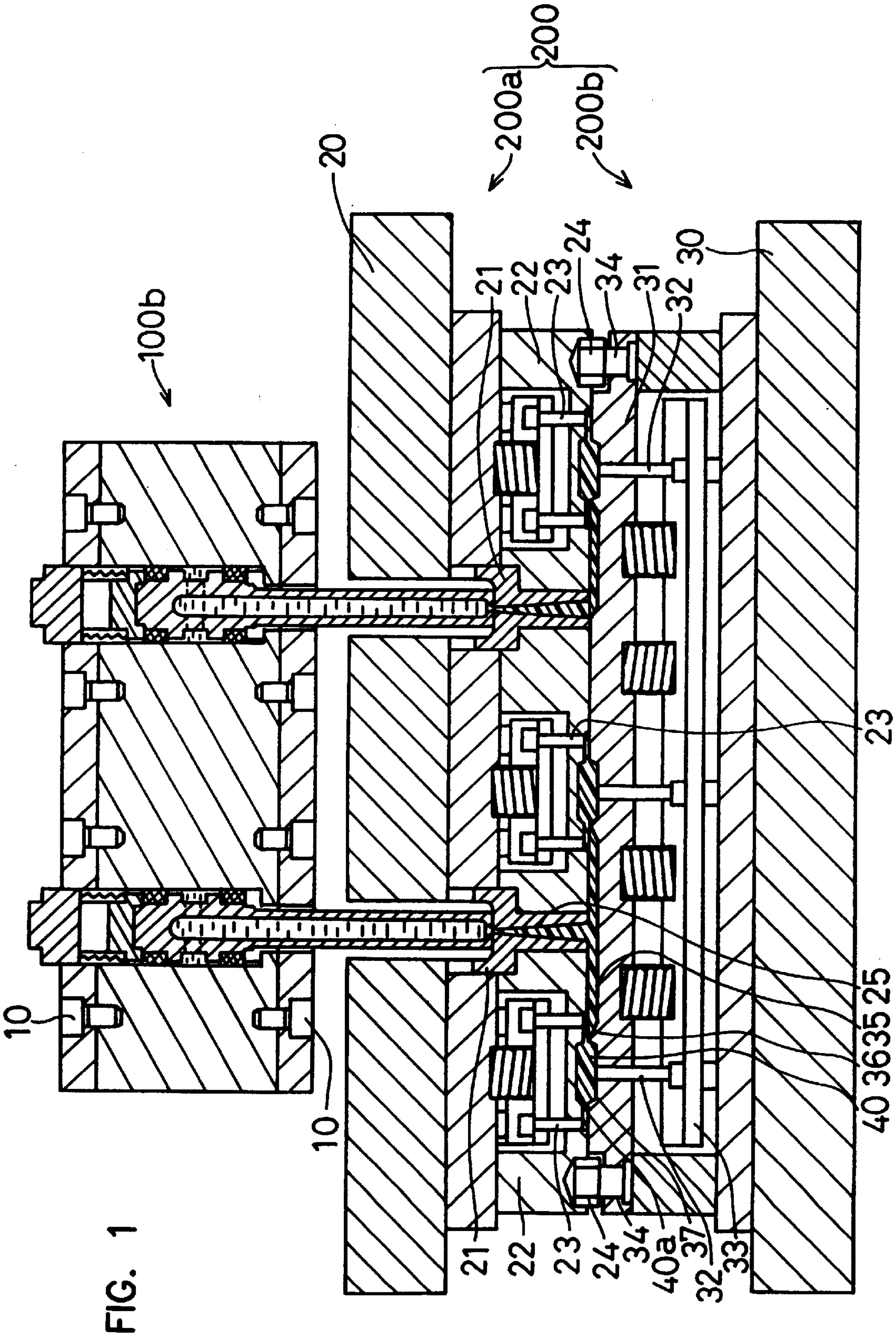
FIG. 1–FIG. 3 are sectional views illustrating the entire configuration of the injection molding apparatus according to Example 1.
Figure 2:
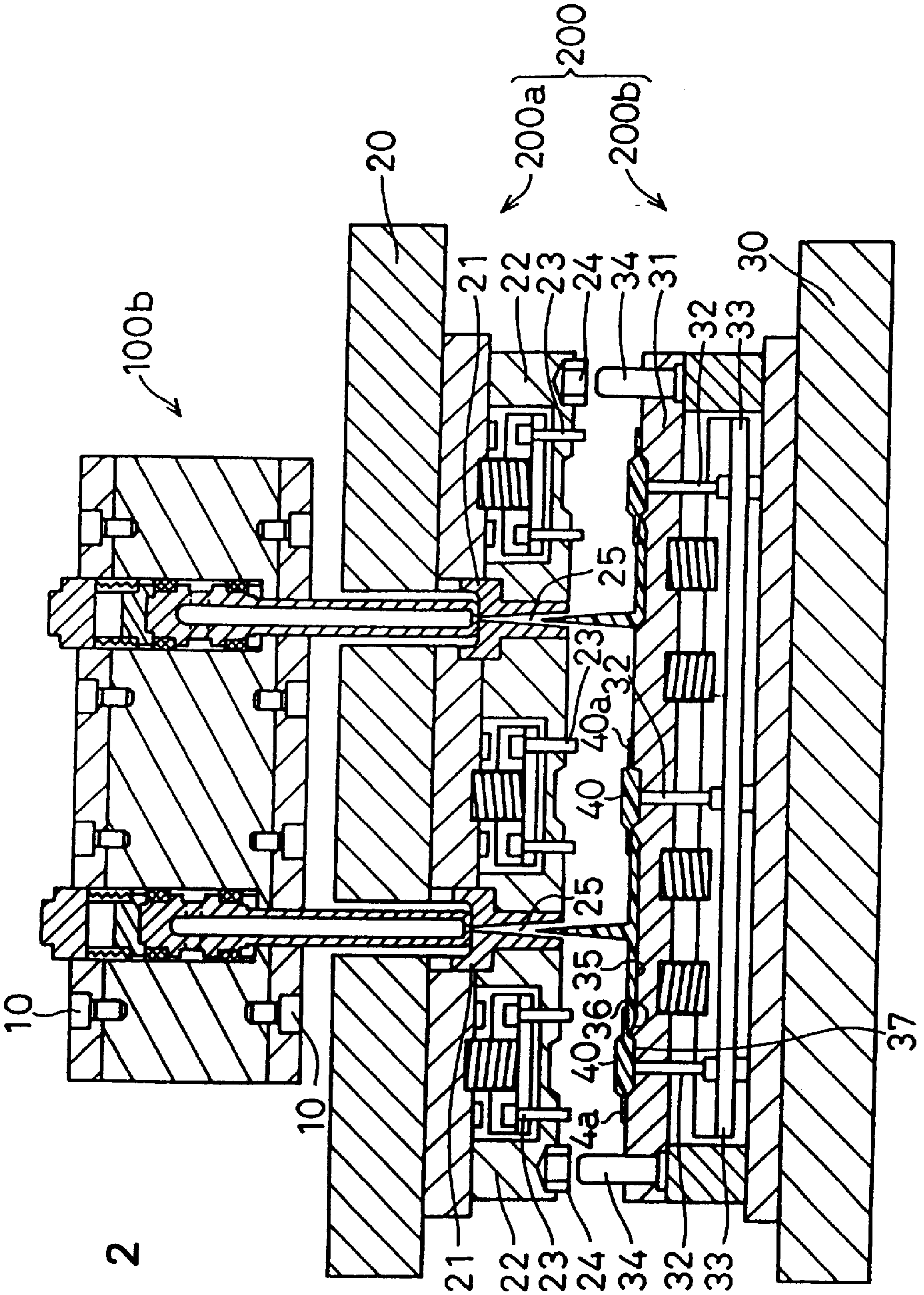
Figure 3:
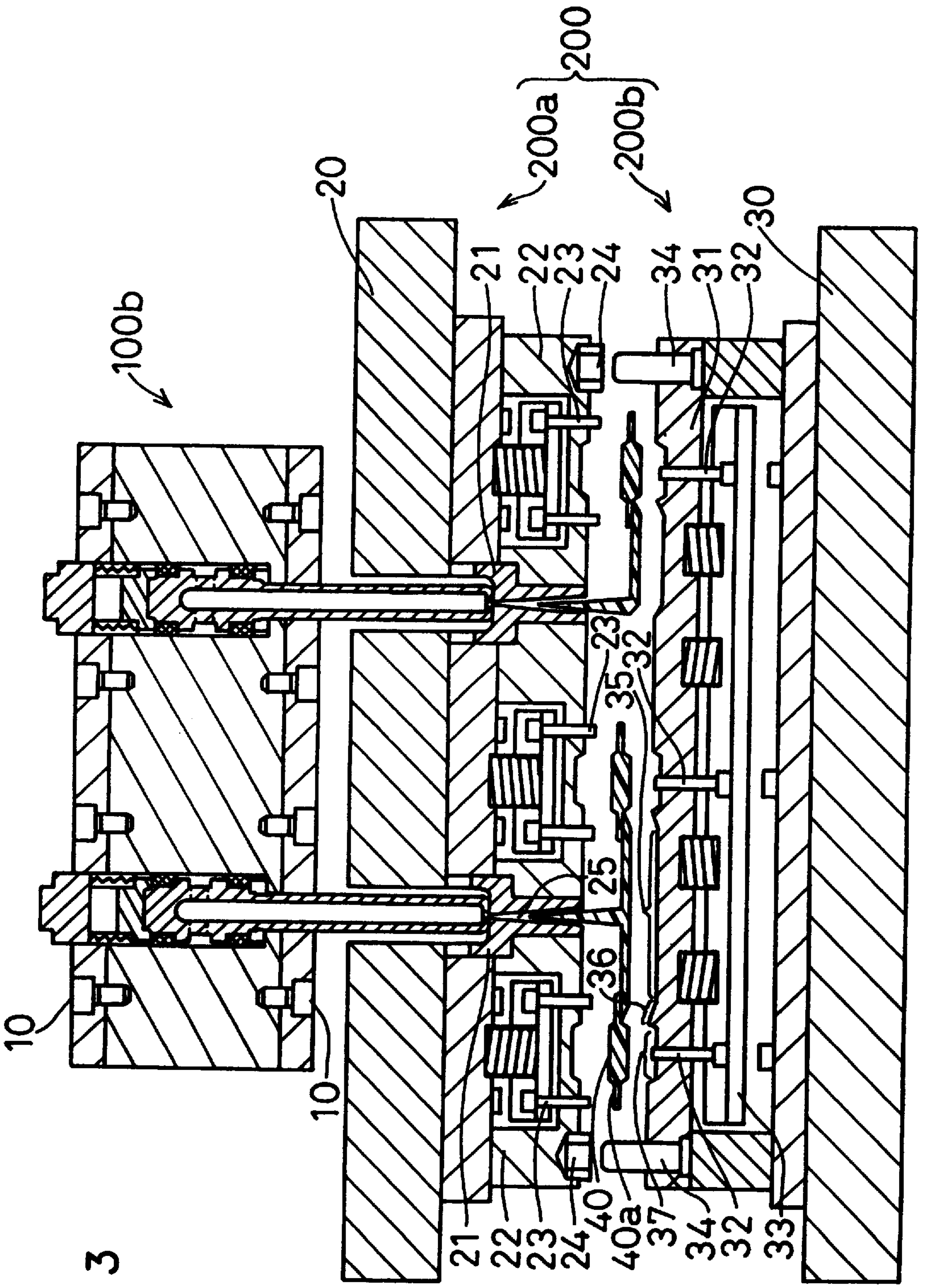
Figure 4:
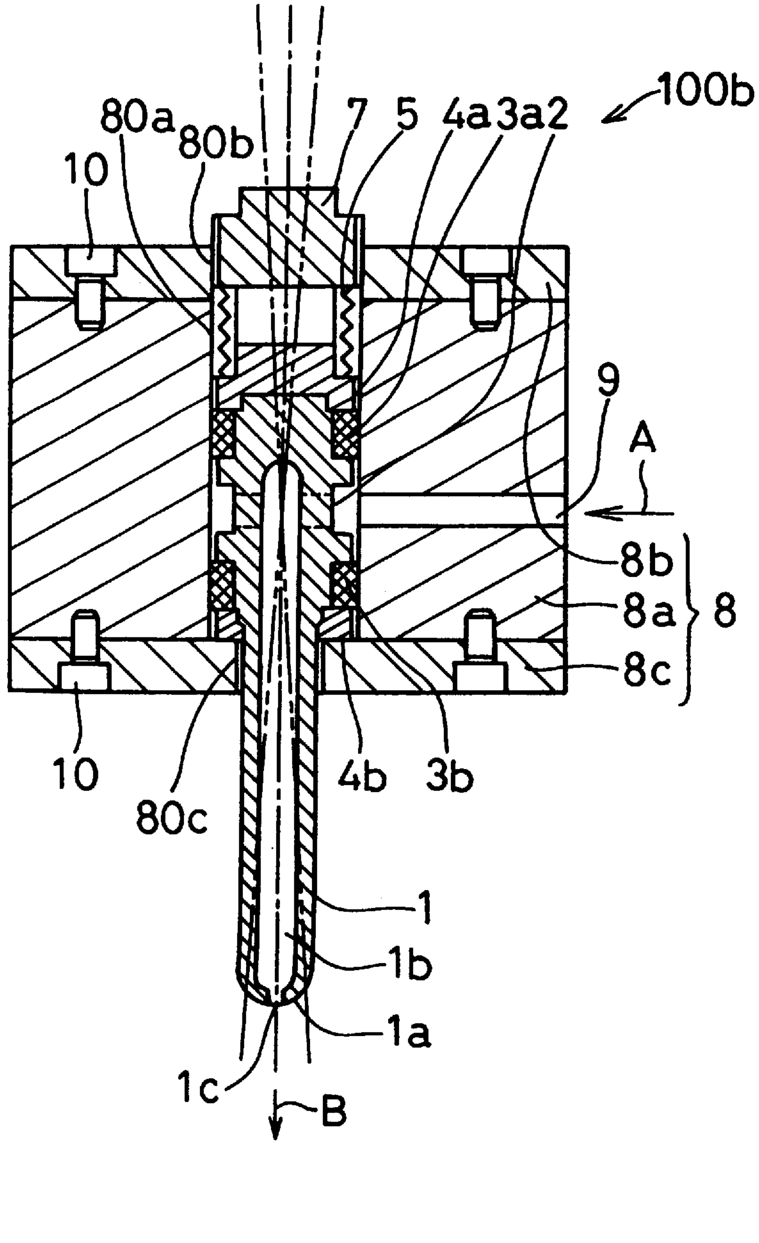
FIG. 4 is an enlarged sectional view of the later stage portion comprising an injection nozzle in the injection unit of the injection molding apparatus according to Example 1 of the present invention.
Figure 5:
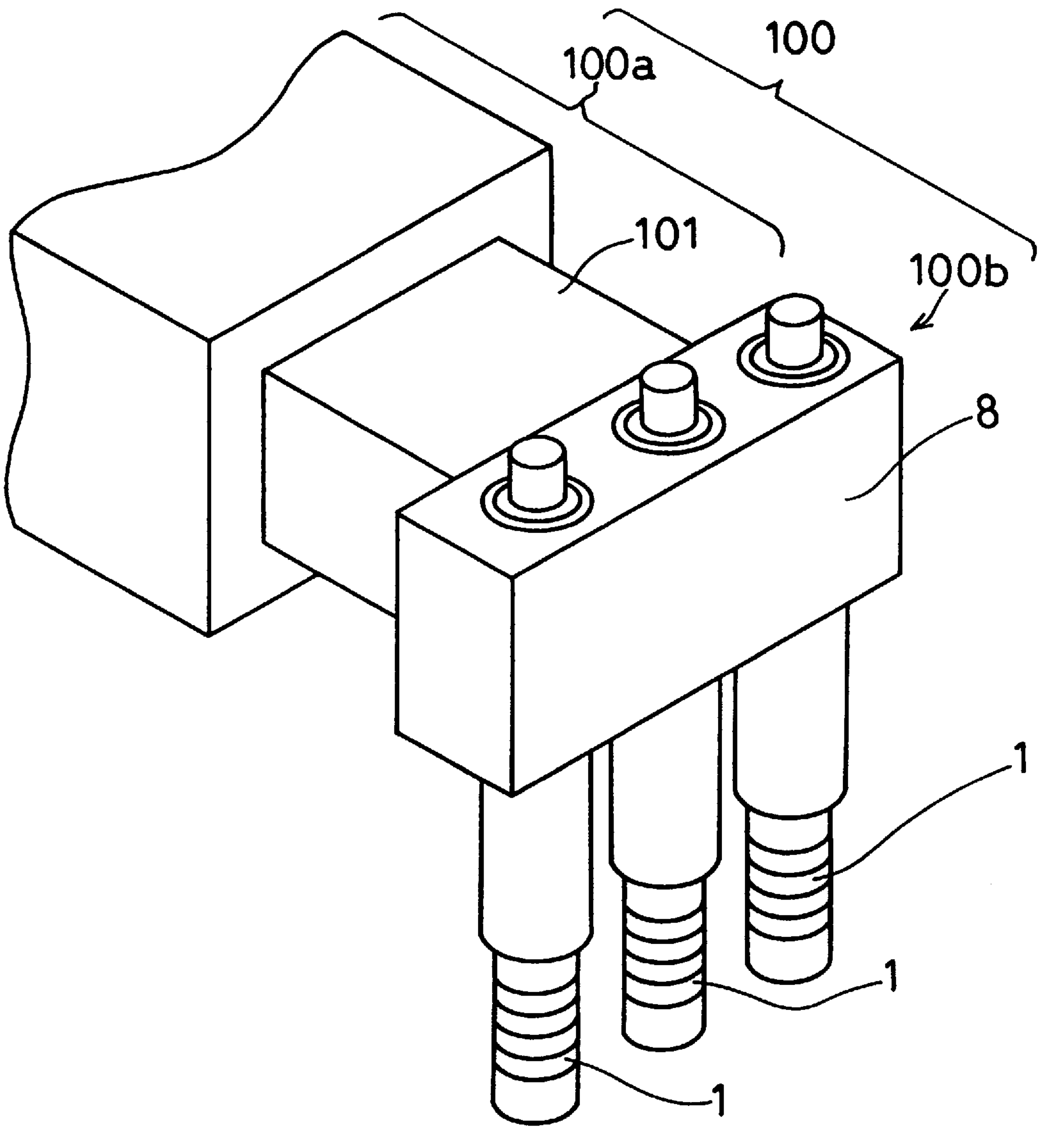
FIG. 5 is a perspective view illustrating the connecting portion between the former stage portion and the later stage portion in the injection unit of the injection molding apparatus according to Example 1 of the present invention.
Figure 6:
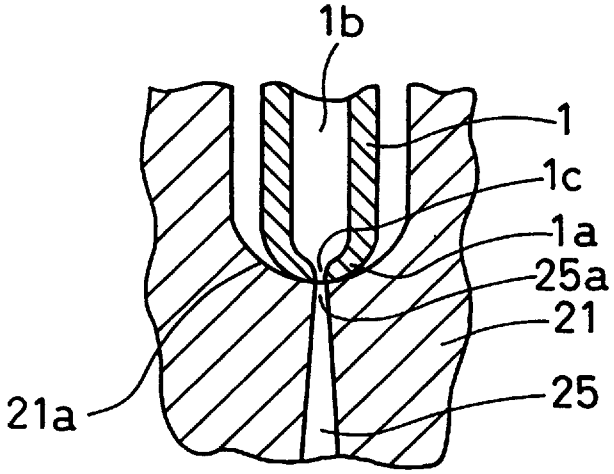
FIG. 6 is an enlarged sectional view of the connecting portion of the injection unit and the mold clamp unit of the injection molding apparatus according to the Example 1 of the present invention.
Figure 11:
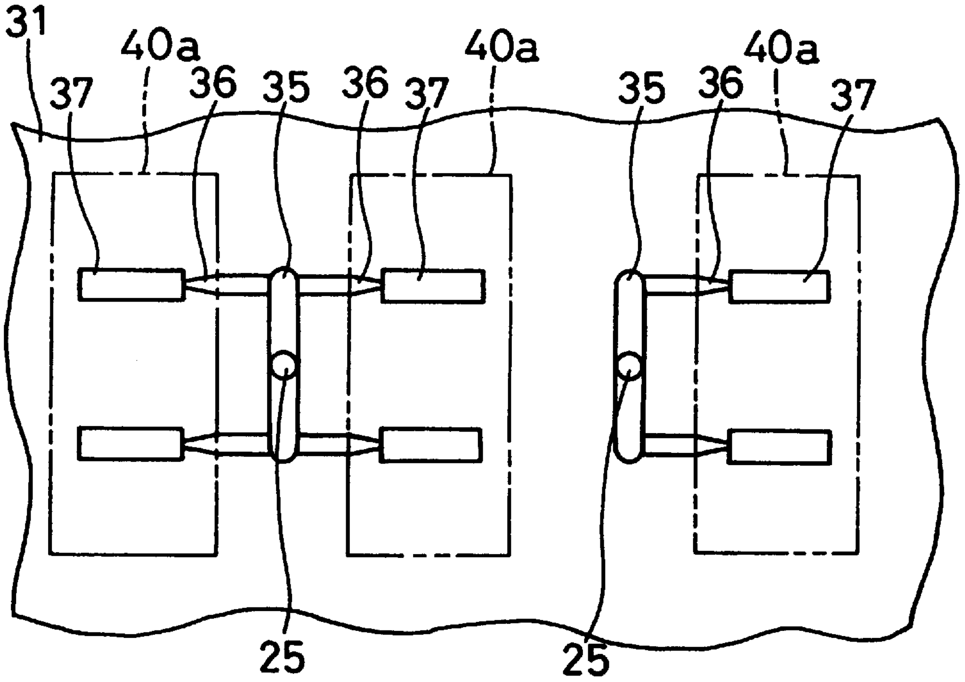
FIG. 11 is a plan view illustrating the surface of the lower mold of the clamp mold unit in the injection molding apparatus according to Example 1 of the present invention.

FIG. 1–FIG. 3 are sectional views illustrating the entire configuration of the injection molding apparatus according to Example 1 of the present invention; FIG. 1 illustrates the state of initiating injection after clamping, FIG. 2 illustrates the state of mold opening of the upper mold and the lower mold after terminating the injection'pressure dwelling, and FIG. 3 illustrates the state of ejecting the molded product from the lower mold after mold opening, that is, the state of separating the molded product, respectively. Further, FIG. 4 is an enlarged sectional view of the later stage portion comprising an injection nozzle in the injection unit of the injection molding apparatus according to Example 1 of the present invention. FIG. 5 is a perspective view illustrating the connecting portion between the former stage portion in which the resin to be molded is melted and injected with predetermined injection pressure and speed and the above mentioned later stage portion in the injection unit of the above mentioned injection molding apparatus. FIG. 6 is an enlarged sectional view of the connecting portion of the injection unit and the mold clamp unit of the above mentioned injection molding apparatus. FIG. 11 is a plan view illustrating the surface of the lower mold of the clamp mold unit in the above mentioned injection molding apparatus.

Hereinafter the configuration and operation will be explained with reference to these drawings.

An injection unit 100 comprises a former stage portion 100*a* to melt the resin to be molded and inject it from an injection cylinder 101 with predetermined injection pressure and injection speed, and a later stage portion 100*b* to inject the molten resin injected from the former stage portion 100*a* to the outside via injection nozzles 1 which are provided therewith. The former stage portion 100*a* of the injection unit per se is a known in-line screw type injection means, and a detailed explanation of its configuration is omitted herein.

The later stage portion 100*b* of the injection unit comprises a manifold 8 in which a branch passage 9 for carrying molten resin is formed. The branch passage 9 branches out the molten resin injected from the former stage portion 100*a*, and a plurality of injection nozzles 1 are installed in the later stage portion 100*b*. The manifold 8 has a plurality of cylindrical holes 80*a* formed through its upper and lower surfaces and an aperture at a predetermined part of one side thereof. The manifold 8 further comprises a manifold main body 8*a* having a branch passage 9 formed to communicate with each of the above mentioned plurality of cylindrical holes 80*a,* a first plate-like body 8*b* mounted with a bolt 10 on the upper surface of the manifold main body 8*a,* and a second plate-like body 8*c* mounted with a bolt 10 on the lower surface of the manifold main body 8*a.* In the first plate-like body 8*b,* a plurality of cylindrical through holes 80*b* are formed to join each of the plurality of the cylindrical holes 80*a* of the manifold main body 8*a,* and columnar screws 7 thread to these plurality of through holes 80*b.* Further, in the second plate-like body 8*c,* a plurality of cylindrical through holes 80*c* of which central axes coincide with the central axes of the cylindrical holes 80*a,* and the aperture areas thereof are smaller than the aperture areas of the cylindrical holes 80*a* are formed corresponding to each hole of the plurality of cylindrical holes 80*a* of the manifold main body 8*a.*

In an injection nozzle 1, a distal end portion 1*a* having an injection hole 1*c* is formed part-spherically. At a first predetermined position with respect to the longitudinal orientation of the injection nozzle 1, a passage 2 is formed to introduce to a nozzle pipe 1*b* the molten resin introduced to the cylindrical hole 80*a* via a branch passage 9. Ring-like elastic members 3*a,* 3*b* obtained by molding polyimide are attached at positions equally distant from the passage 2, namely, a second predetermined position on the upper side and a third predetermined position on the lower side. Here the elastic members 3*a,* 3*b* are fixed by fitting into the recesses formed in the periphery of the nozzle and being fastened by a disc type screw 4*a* and a ring type screw 4*b*. And the injection nozzles 1 to which the ring-like elastic members 3*a,* 3*b* are attached are inserted in each hole of the plurality of cylindrical holes 80*a* of the manifold 8 where the first and second plate-like bodies 8*b,* 8*c* are connected at the upper and lower surfaces of the manifold main body 8*a,* with the springs 5 arranged on the disc type screws 4*a* for each hole, by threading the columnar screws 7 to the through hole 80*b* of the plate-like body 8*b,* the injection nozzles 1 are attached in the state where a predetermined length of the distal end portion 1*a* side having injection holes 1*c* is projected outside the manifold 8. Here, the injection nozzles 1 are fixed at each hole by the ring-like elastic members 3*a,* 3*b* attached thereto contact with the inside of the cylindrical holes 80*a* of the manifold main body 8*a,* the lower edge portion of the ring type screw 4*b* contacting with the second plate-like body 8*c,* and the rear edge portion (disc type screw 4*a*) of the injection nozzles 1 is pressed by the spring 5, and the distal end portion 1*a* having the injection hole 1*c* can move in any direction in response to the external force applied thereto. The injection nozzles 1 are illustrated in two pieces in FIG. 1 and in three pieces in FIG. 5. This is for the convenience of explaining the construction to facilitate the understanding, a few pieces are shown, and thus three or more pieces of injection nozzles 1 are often used in reality.

The mold clamp unit 200 comprises a first mold clamp unit 200*a* formed by attaching an upper mold 22 and a sprue bush 21 to a first die plate 20, and a second mold clamp unit 200*b* formed by attaching a lower mold 31 to a second die plate 30. In the first mold clamp unit 200*a,* the sprue bush 21 having a nozzle reception portion 21*a* to which the distal end portion 1*a* of the above mentioned injection nozzle 1 is fitted, and a sprue 25 for introducing the molten resin injected from the injection hole 1*c* of the distal end portion 1*a* of the above mentioned injection nozzle 1 to the surface of the upper mold 22, having an introduction orifice 25*a* at the center of the nozzle reception portion 21*a* are formed. Further, at the inside portion of the upper mold 22 on the first die plate 20, an eject pin 23 is arranged to press a metallic part (lead frame) 40*a* of a molded product (a packaged semiconductor chip) 40 to the surface of the lower mold 31 at the time of opening the mold after finishing clamping in the insert molding using metallic parts, for example, in the packaging of semiconductor tips using a lead frame. In the second mold clamp unit 200*b,* a cavity 37 as the mold for the molded products, a runner 35 to receive and introduce the resin from the sprue 25 to the cavity 37, and a gate 36 as the introduction portion to introduce the resin received from the runner 35 to the cavity 37 are formed on the surface of the lower mold 31. Further, at the inside portion of the lower mold 31 on the second die plate 30, an ejector mechanism comprising an ejector plate 33, and an ejector pin 32 is arranged, and the removal of the molded product 40 from the lower mold 31 is conducted thereby. Further, in the present embodiment device, as illustrated in FIG. 6, the distal end portion 1*a* of the injection nozzle 1 is part-spherical, and as to the shape of the nozzle reception portion 21*a,* it has a part-spherical concave shape having a radius of curvature (11.0 mm) slightly larger than the radius of curvature (10.00 mm) of the distal end portion 1*a* of the injection nozzle 1. On the surface of the lower mold 31, as illustrated in FIG. 11, a plurality of cavities 37 are formed to branch via the gate 36 from the runner 35 connected to the sprue 25 so as to supply the resin from one sprue 25 at least to two or more cavities 37. In conducting packaging of semiconductor chips, the metallic part (lead frame) 40*a* is mounted on the surface of the lower mold 31. Further, a plurality of the injection nozzles 1 of the injection unit 100 are positioned by fitting the respective distal end portions 1*a* to the corresponding nozzle reception portions 25 of the sprue bushes 21 in the vicinity of the surface of the upper mold 22 and the lower mold 32 in the mold clamp unit 200, thus a so-called "extension multi-head nozzle" is formed. Arrows A, B, in FIG. 4 are the arrows to illustrate the direction in which the resin flows.

Next, the operation will be explained. The operation in conducting packaging semiconductor chips will be explained here. Both the injection unit 100 and the mold clamp unit 200 are driven by an electrically-driven servo motor, which is not illustrated in the figures. First, in the mold clamp unit 200, the upper mold 22 and the lower mold 31 are opened, semiconductor chips (not illustrated) and lead frames 40*a* are positioned at the cavities 37 of the lower mold 31, and afterwards, the first mold clamp unit 200*a* having the upper mold 22 and the second mold clamp unit 200*b* having the lower mold 31 are clamped. Next the entire injection unit 100 moves so as to fit the respective distal end portions 1*a* of the plurality of the injection nozzles 1 of the later stage portion 100*b* to the corresponding nozzle reception portions 21*a* of the sprue bush 21 of the first mold clamp unit 200. Then a resin melted, kneaded and measured for a predetermined amount in the former stage portion 100*a,* for example, polyphenylene sulfide (PPS) is injected to the later stage portion 100*b* with the injection cylinder 101 with a predetermined injection pressure (for example, 50–200 $kg/cm^2$) and a predetermined injection ratio at the plunger portion (0.16–0.32 $cm^3/sec$), the injected resin goes through the nozzle pipes 1*b* of the plurality of injection nozzles 1 of the later stage portion 100*b* and is injected from the injection holes 1*c* of the distal end portions 1*a* to the inside of the sprue 25, and fills the cavities 37 through the runners 35 and the gates 36 (FIG. 1). At the time of this filling, pressure dwelling and cooling of the molds 22, 31 are conducted, and further, at the injection unit 100, melting, kneading (plasticizing), and measurement of a resin to be molded are conducted for the next molding. Polyphenylene sulfide (PPS) is used as the resin to be molded here, because it shows an excellent flowability in the melted state, and thus the resin can fill each cavity without filling failure even when a mold having a large number of cavities is used. Further, for polyphenylene sulfide (PPS) is a thermoplastic resin that solidifies by cooling in a short time, besides, it exhibits an excellent adherence to the lead frames. Further, by using polymethyl penten as a resin to be molded, the same effect as the above mentioned case of using polyphenylene sulfide (PPS) is obtained, and besides, since it is highly transparent, it can prevent deterioration of the element characteristic caused by molding when the semiconductor chip is a chip for an optical semiconductor element such as a light emitting diode or a photodiode. Next, the first clamp mold unit 200*a* having the upper mold 22 moves to open the upper mold 22 and the lower mold 31 (FIG. 2). At the time of initiating the mold opening, in the first mold clamp unit 200*a,* the eject pins 23 press the lead frames 40*a* of the molded products (packaged semiconductor chips) 40 against the surface of the lower mold 31 to prevent deformation of the lead frames 40. Next, by the ejector mechanism comprising an ejector plate 33 and ejector pins 32 of the second mold clamp unit 200*b,* the molded products 40 are ejected from the lower mold 31 (FIG. 3), followed by detachment of resin in unnecessary portions corresponding to sprues, runners, and gates. Thereafter, the molding process explained above will be conducted repeatedly.

As mentioned in the above mentioned explanation of the conventional technology, although the injection unit 100 (injection nozzles 1) and the mold clamp unit 200 (sprues 25) are set to have the temperature difference of approximately 100°–200° C., due to repetition of the molding process, the mold clamp unit 200 (sprues 25) is heated by the contact with the injection unit 100 (injection nozzles 1), and due to its partial heat expansion and heat shrinkage, the formation pitch of the plurality of the nozzle reception portions 21*a* changes. Since the plurality of the injection nozzles 1 are mounted in the injection unit 100 in such a way that the respective distal end portions 1*a* having the injection holes 1*c* thereof can move to any direction by the external force applied thereto, namely, loosely, in the apparatus of this example as mentioned above, even if the central axes do not coincide mutually at the corresponding nozzle reception portions 21*a*, by their descent while contacting with the inner surface of the nozzle reception portions 21*a*, they move loosely in response to the external force received from the inner surface of the nozzle reception portions 21*a* to fit in the state where the both central axes of the distal end portions 1*a* of the injection nozzles 1 and the nozzle reception portions coincide, that is, in the state where the injection holes 1*c* of the distal end portions 1*a* of the injection nozzles 1 and the introduction orifices 35*a* of the nozzle reception portions 21*a* coicide.

Accordingly, in the apparatus of this example, regardless of the change of the formation interval (formation pitch) of a plurality of nozzle reception portions 21*a* in the mold clamp unit 200, from each of the plurality of injection nozzles 1 of the injection unit 100 a predetermined amount of molten resin can always be supplied to the corresponding cavity 37 in the mold clamp unit 200 so that molded products in a preferable molding state can be formed with a good reproductivity. By adopting the configuration where the first mold clamp unit 200*a* having the upper mold 22 and the second mold clamp unit 200*b* having the lower mold 22 are arranged above and below in the mold clamp unit 200 so that the upper mold 22 and the lower mold 31 can open or close above and below, and the injection unit 100 is connected to the mold clamp unit 200 from above, extending horizontally, the parts fixation in the insert molding can be conducted easily, and besides, the height occupied by the apparatus can be shortened. Further, since the plurality of injection nozzles 1 comprise an extension multi-head nozzle, a molten resin can be filled to the cavities 37 securely without solidification to improve the production yield. Further, since the injection unit 100 and the mold clamp unit 200 are driven by an electrically-driven servo motor, namely, entirely electrically-driven, it provides excellent quietness and cleanliness, and thus it is advantageous in the semiconductor chip packaging in a clean room.

(EXAMPLE 2)

Figure 7:
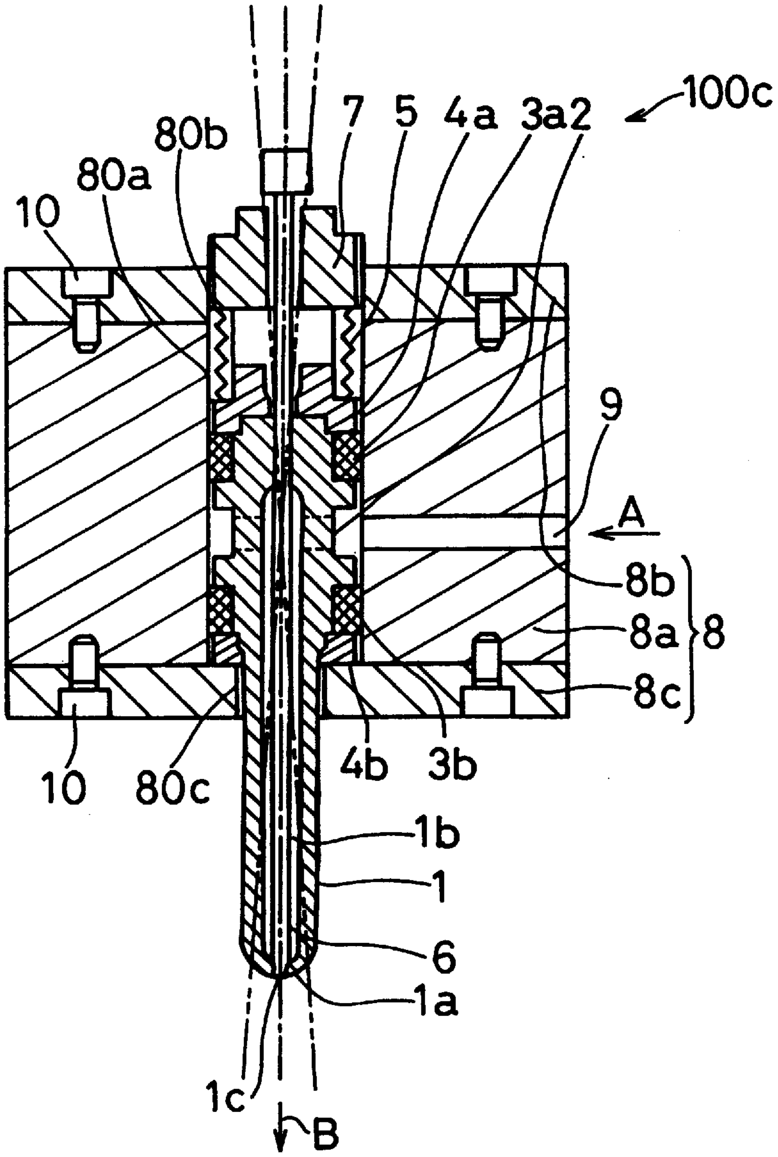
FIG. 7 is a sectional view illustrating the configuration of the later stage portion in the injection unit of the injection molding apparatus according to Example 2 of the present invention.
Figure 8:
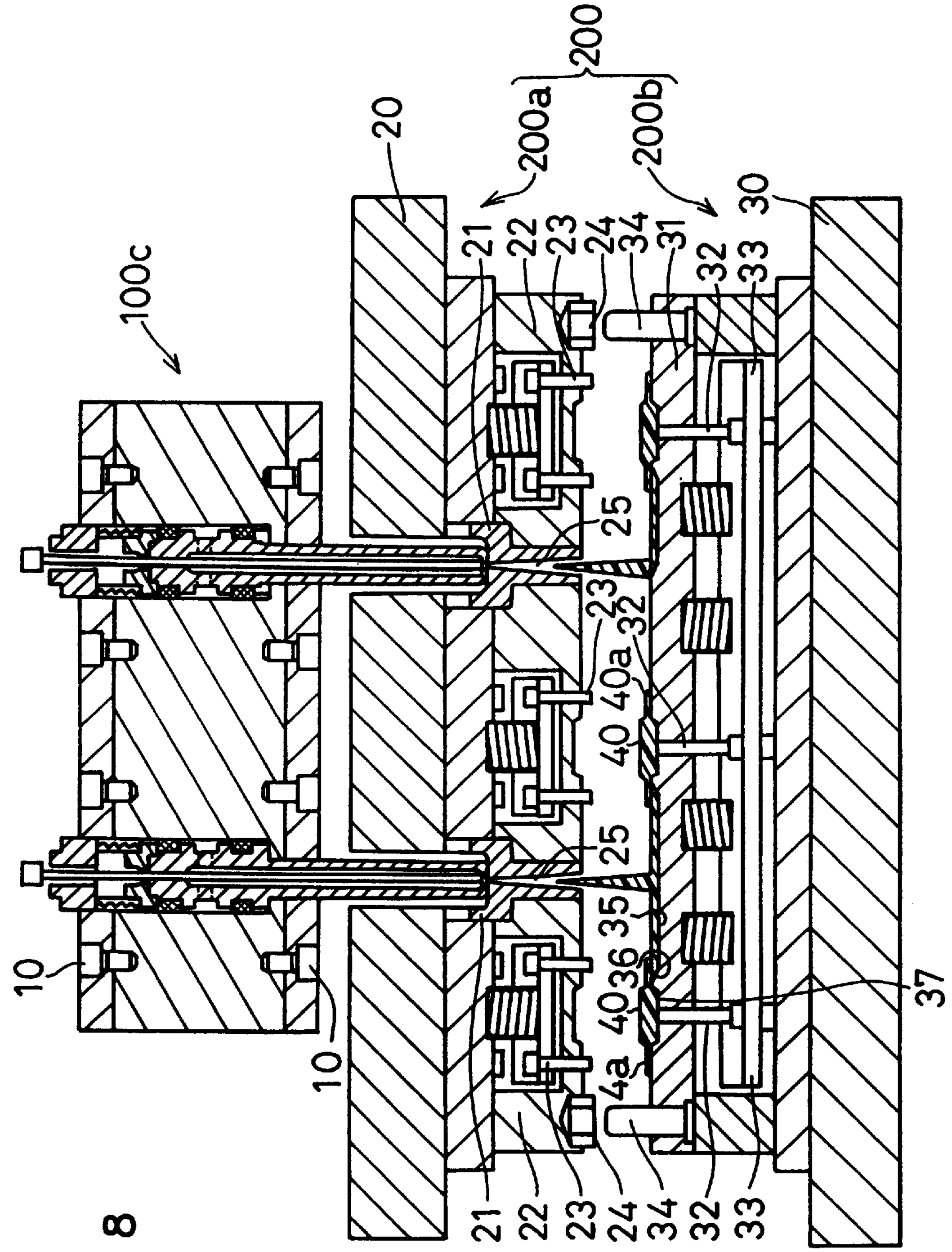
FIG. 8 is a sectional view illustrating the entire configuration of the injection molding unit according to Example 2 of the present invention.

FIG. 7 is a sectional view illustrating the configuration of the later stage portion in the injection unit of the injection molding apparatus according to Example 2 of the present invention. Further, FIG. 8 is a sectional view of the entire configuration of the injection molding apparatus illustrating the state of ejecting the molded products from the lower mold after mold opening, that is, detaching the molded products. In these FIGS., numerals the same as in FIGS. 3, 4 denote the same or corresponding parts. The injection molding apparatus of this example has a later stage portion 100*c* illustrated in FIG. 7, which replaces the later stage portion 100*b* of the injection unit in the injection molding apparatus of the above mentioned example 1. The later stage portion 100*c* is formed by arranging the needle valves 6 for opening and closure of the injection holes 1*c* in the respective nozzle pipes 1*b* of the plurality of injection nozzles 1 of the later stage portion 100*b* of the injection unit of the above mentioned example 1.

In the apparatus of this example, by closing the injection holes 1*c* of the nozzle distal end portions 1*a* by the needle valves oriented inside the nozzle pipes 1*b* of the injection nozzles, the molten resin leakage from the injection holes 1*c* called drooling and stringiness can be eliminated. Therefore, the apparatus of this example can improve the operation efficiency of the apparatus compared with the injection molding apparatus of the above mentioned example 1. In particular, it shows a significant effect with the molten resin having a low viscosity.

(EXAMPLE 3)

Figure 9:
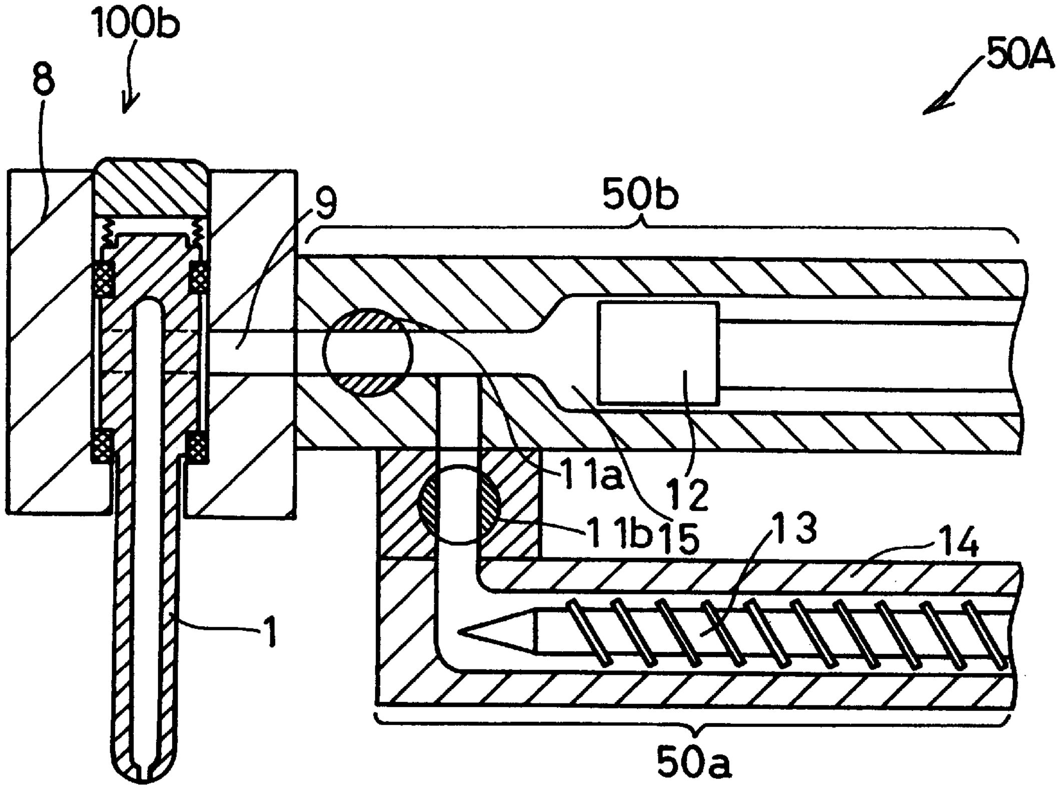
FIG. 9 is a sectional view illustrating the configuration of the injection unit of the injection molding unit according to Example 3 of the present invention.

FIG. 9 is a sectional view illustrating the configuration of the injection unit of the injection molding apparatus according to Example 3 of the present invention, in the FIG., numerals the same as in FIGS. 4, 5 denote the same or corresponding parts. The injection molding apparatus of this example has a former stage portion 50A illustrated in FIG. 9, which replaces the former stage portion 100*a* of the injection unit in the injection molding apparatus of the above mentioned example 1. The former stage portion 50A is a screw preplasticizing injection means, comprising a screw type melting and kneading means where a resin thrown in a hopper (not illustrated) is introduced to the inside of the heated cylinder 14 and is melted and kneaded by the screw 13 in the cylinder 14, and an injection dedicated means 50*b* where the resin melted and kneaded by the screw type melting and kneading means is stored in a space 15 in the front portion of the injection plunger 12 in a predetermined amount, and injected by the injection plunger 12. 11*a*, 11*b* in FIG. 9 denote switching valves, the switching valve 11*a* closes the channel when storing a predetermined amount of the molten resin in the space 15 in the front portion of the injection plunger 12, with the switching valve 11*b* opening the channel, and the molten resin is introduced in a predetermined time from the screw type melting and kneading means 50*a* to the space 15, and the switching valve 11*b* close the channel. Then, when injecting the molten resin, the switching valve 11*a* opens the channel, with the switching valve 11*b* closing the channel, and the injection plunger 12 forces out the molten resin to the passage 9 of the later stage portion 100*b*.

In the apparatus of this example, since the former stage portion 50A of the injection unit is a screw preplasticizing injection means, a predetermined amount of the resin to be injected can be precisely measured and injected so as to reduce the characteristic variance of the molded products obtained in each cycle in implementing repeated molding cycles, and thus the production yield can be improved.

(EXAMPLE 4)

Figure 10:
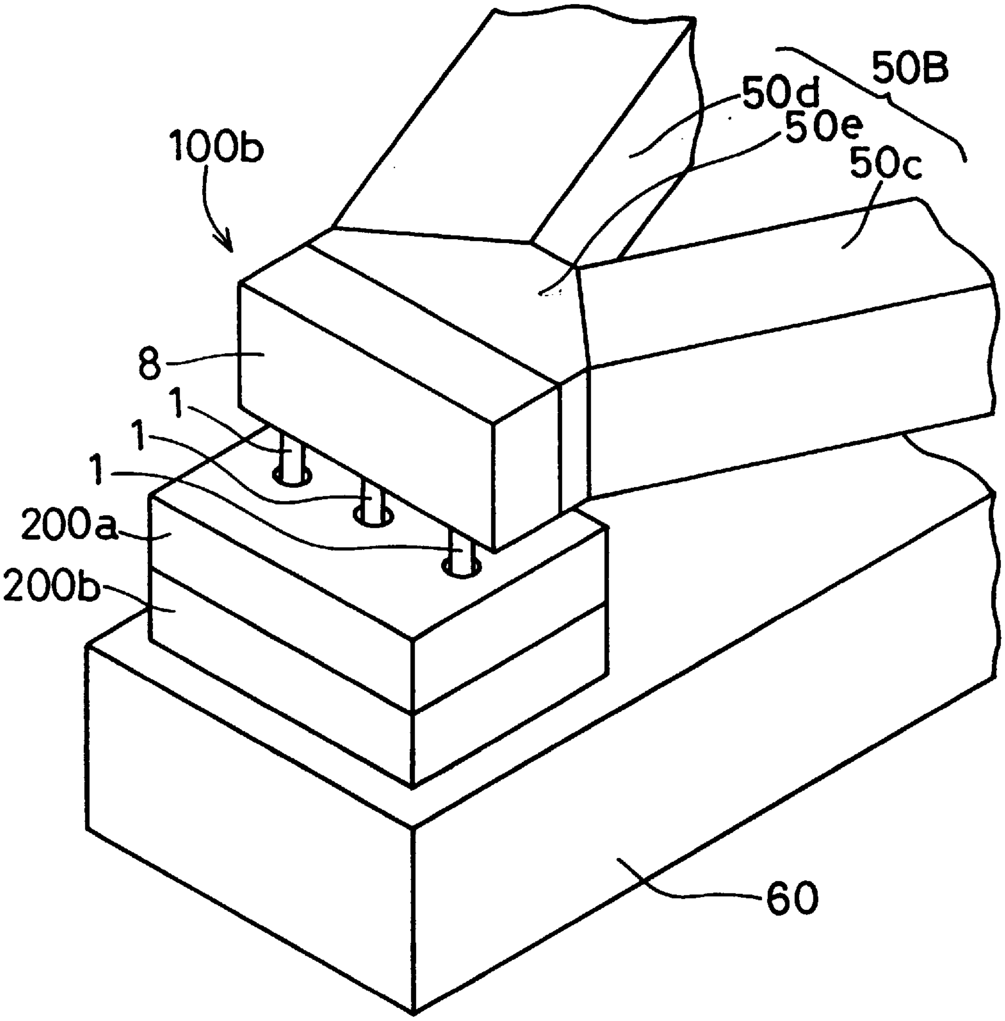
FIG. 10 is a perspective view illustrating the entire configuration of the injection molding unit according to Example 4 of the present invention.

FIG. 10 is a perspective view illustrating the entire configuration of the injection molding apparatus according to Example 4 of the present invention, in the FIG., numerals the same as in FIGS. 1, 4, 5 denote the same or corresponding parts. The injection molding apparatus of this example has a configuration basically the same as the injection molding apparatus of the above mentioned example 3. But it is constituted by replacing a former stage portion 50A of the injection molding apparatus of the above mentioned example 3, that is, the screw preplasticizing injection means constituted with the screw type melting and kneading means 50*a* and the injection dedicated means 50*b* arranged so as to superimposed above and below by a screw preplasticizing injection means (former stage portion) 50B comprised by connecting a screw type melting and kneading means 50*c* and an injection dedicated means 50*d* with a connecting portion 50*e* so as to form V-shape horizontally in a position at the same level with respect to the upper surface of the working table 60 on which a mold clamp unit (a first mold clamp unit 200*a,* a second mold clamp unit 200*b*) is mounted. Here the connecting portion 50*e* is included in the injection dedicated means 50*d* in terms of function, wherein a space to measure a molten resin from the screw type melting and kneading means 50*c* is formed, and the molten resin stored in the space was injected to the later stage portion 100*b* by being forced out by the injection plunger 12 of the injection dedicated means 50*d.*

In the apparatus of this example, since the distance between the hopper to throw in the material of the screw type melting and kneading means 50*c* and the injection dedicated means 50*d* can be wider compared with that of the injection molding apparatus of the above mentioned example 3, the operation of throwing the resin material into the hopper can be conducted easily. Further, since the other means 50*d* (50*c*) does not disturb the maintenance operation of one means 50*c* (50*d*), the operativity of the maintenance operation of the apparatus is improved.

Although in the above mentioned example, one obtained by molding polyimide was used as the ring-like elastic member to elastically support and fix the injection nozzle in the manifold, since in this invention, the elasticity of the ring-like elastic member can be maintained in a high temperature at 300° C. or more by using a ring-like elastic member molded with at least one selected from the group consisting of polyimide, polybenzimidazole, polyether nitrile, polyether ketone, polyketone sulfide, polyether sulfone, ester cyanide resin and asbestoes impregnated in graphite, or at least one thereof and polyimide as the material, the injection nozzle can be stably supported so as to allow the distal end portion thereof to move freely over a long period.

Although polyphenylene sulfide was used as the resin to be molded in the above mentioned example, in this invention, the same effect can be obtained by using polymethyl penten.

INDUSTRIAL APPLICABILITY

As mentioned above, according to the injection molding apparatus of the present invention, in an injection molding apparatus comprising an injection unit having a plurality of injection nozzles, the respective distal end portion of the above mentioned plurality of injection nozzles can be fitted to the corresponding nozzle reception portion formed in the mold clamp unit with the central axis of the injection hole at the vertex of the above mentioned distal end portion always meet the central axis of the resin introduction orifice at the center of the above mentioned nozzle reception portion. Thus, a predetermined amount of a molten resin can always be supplied stably to inside the mold clamp unit. Therefore, the production yield can be improved significantly in production of electric'electronic parts, production of automobile parts, etc., where a mold having a number of cavities is used to obtain as many molded products as possible in one molding cycle. Further, since the number of cavities in one nozzle is reduced by increasing the number of nozzles, variance of the resin amount filled in each cavity reduces, and thus the quality of the molded products is improved. Further, a vertical mold clamp unit suitable for the insert molding to mold the resin with metallic parts in a cavity is provided, and thus ones preferably used particularly in the packaging operation of the semiconductor chips can be provided.

We claim:

1. An injection molding apparatus comprising:

an injection unit having a plurality of injection nozzles having respective distal end portions that move back and forth between a first position and a second position spaced therefrom by a predetermined distance by movement of the injection unit, and a molten resin is injected from an injection opening arranged at a vertex portion of the distal end portion of said plurality of injection nozzles when the respective distal end portions of said injection nozzles are at said second position, a mold clamp unit comprising a first mold clamp unit having a first frame body and an upper mold mounted on the first frame body, a second mold clamp unit having a second frame body and a lower mold mounted on the second frame body, wherein a plurality of nozzle reception portions to which said distal end portions of the injection nozzles fit respectively are formed in one of said first and second frame bodies and a resin introduction passage is formed for introducing molten resin from central portions of the plurality of nozzle reception portions to a plurality of cavities formed between said upper mold and lower mold as they are clamped is formed, wherein said respective distal end portions of the plurality of injection nozzles move to said second position when respective distal end portions of the plurality of injection nozzles are fitted and fixed to a corresponding one of said nozzle reception portions so as to inject the molten resin from said injection openings to said resin introduction passage, wherein a manifold having a plurality of cylindrical holes to accommodate said plurality of injection nozzles, and a molten resin passage formed to communicate with one side thereof is provided, and wherein said injection nozzles are inserted into said cylindrical holes so that distal end portions thereof project outside said manifold and distal end portions of said plurality of injection nozzles are mounted by providing first and second ring-shaped elastic members outside said plurality of injection nozzles and inside said plurality of cylindrical holes to permit the respective distal end portions to move loosely in any direction in response to an external force applied thereto.

2. The injection molding apparatus as recited in claim 1, wherein said distal end portions are part-spherical, and said plurality of nozzle reception portions are part-spherical concave shaped, the nozzle reception portions having a radius of curvature slightly larger than a radius of curvature of said distal end portions of the injection nozzles.

3. The injection molding apparatus as recited in claim 1, wherein said injection unit comprises a former stage portion to melt and inject a resin to be molded and a later stage portion comprising said plurality of injection nozzles to inject the molten resin injected from first injection means to outside said injection nozzles via said plurality of injection nozzles, said plurality of injection nozzles comprising a passage for introducing a molten resin from outside said injection nozzles to an internal nozzle tube at a first longitudinal position, first and second ring-shaped elastic members being attached to the injection nozzles, respectively at a second longitudinal position and a third longitudinal position spaced the same distance from and on opposite sides with respect to, said first position, and said plurality of injection nozzles are fixed respectively by being pressed in a direction of injection.

4. The injection molding apparatus as recited in claim 1, wherein said injection unit comprises a later stage portion comprising said plurality of injection nozzles, said plurality of injection nozzles comprising a passage for introducing a molten resin from outside the injection nozzles to an internal nozzle tube at a first longitudinal position, first and second ring-shaped elastic members being attached to the injection nozzles, respectively at a second longitudinal position, and a third longitudinal position spaced the same distance from, and on opposite sides with respect to, said first longitudinal position, a manifold main body having a plurality of cylindrical holes to allow said plurality of injection nozzles to pass through between upper and lower surfaces, and a branch passage for carrying molten resin formed to communicate with each of said plurality of cylindrical holes from a predetermined part of one side thereof, a first plate-shaped body in which a plurality of through holes to join a corresponding hole among said plurality of cylindrical holes formed in said manifold main body is provided to be attached removably to the upper surface of said manifold main body, a second plate-shaped body in which a plurality of through holes having an aperture area smaller than the aperture area of a corresponding hole among said plurality of through holes formed in said manifold main body to be attached removably to the lower surface of said manifold main body, a plurality of columnar screws to respectively thread to said plurality of through holes of said first plate-like body, and a plurality of spring members arranged respectively in a plurality of spaces formed with said plurality of columnar holes of said manifold main body and said plurality of through holes of the first plate-like body and intervening between said columnar screws and rear end portions of the injection nozzles in pressing contact with said rear end portions of the injection nozzles.

5. The injection molding apparatus as recited in claim 3, wherein said former stage portion is a screw preplasticizing injection means comprising a screw melting and kneading means, where a resin thrown into a hopper is introduced inside a heated cylinder and melted and kneaded by a screw in the cylinder, and an injection dedicated means to store a predetermined mount of the resin in a space in a front portion of an injection plunger and to inject the resin with the injection plunger.

6. The injection molding apparatus as recited in claim 1, wherein said mold clamp unit includes said second mold clamp unit, said mold clamp unit being fixed and arranged on a working tables and said upper mold and lower mold open and close in upward and downward directions by movement in the upward and downward directions of the first mold clamp unit above said second mold clamp unit, wherein said injection unit comprises a former stage portion to melt and inject a resin to be molded and said plurality of injection nozzles, and further comprises a later stage portion to inject the molten resin, injected from said first injection means, to outside the injection nozzles via said plurality of injection nozzles, and wherein the injection unit is designed to move in upward and downward directions so that the respective distal end portions of said plurality of injection nozzles fit correspondingly into said plurality of nozzle reception portions formed in said first frame body of said mold clamp unit, and wherein said former stage portion is a screw preplasticizing injection means, comprising a screw melting and kneading means, where a resin thrown into a hopper is introduced inside a heated cylinder and melted and kneaded by a screw in the cylinder, and an injection dedicated means to store a predetermined amount of the resin in a space in a front portion of an injection plunger and to inject the resin with the injection plunger, and said former stage portion is connected to a side portion of said later stage portion parallel with respect to an upper surface of said working table.

7. The injection molding apparatus as recited in claim 6, wherein said screw melting and kneading means and said injection dedicated means are connected so as to form a V-shape in a position level with respect to the upper surface of the working table.

8. The injection molding apparatus as recited in claim 1, wherein said plurality of nozzle reception portions are formed in a position in vicinity of said plurality of cavities, and said plurality of injection nozzles of the injection unit are extension nozzles.

9. The injection molding apparatus as recited in claim 1, wherein a shut-off valve for opening and closing said injection opening is arranged at said plurality of injection nozzles.

10. The injection molding apparatus as recited in claim 1, wherein said mold clamp unit conducts an insert molding of electric or electronic parts in said plurality of cavities, and eject pins are arranged in said first frame body for pressing metallic parts toward a surface of said lower mold via a through hole formed in said upper mold, at the time of mold opening after terminating said clamping.

11. The injection molding apparatus as recited in claim 10, wherein said electric or electronic parts are semiconductor chips, the metallic parts are lead frames, and the mold clamp unit conducts packaging of the semiconductor chips.

12. The injection molding apparatus as recited in claim 1, further comprising a resin introduction orifice in at least one of said first and second frame bodies, comprising a plurality of sprues, which resin introduction orifice is arranged at respective center points of said plurality of nozzle reception portions, and a runner for connecting the plurality of sprues and said plurality of cavities so that the resin can be supplied from each one of the plurality of sprues to at least two cavities.

13. The injection molding apparatus as recited in claim 1, wherein said ring-shaped elastic members are formed using at least one selected from the group consisting of polyimide, polybenzimidazole, polyether nitrile, polyether ketone, polyketone sulfide, polyether sulfone and ester cyanide resin, or formed by covering an elastic member mainly comprising an asbestos with a metallic fiber.

14. The injection molding apparatus as recited in claim 1, wherein said molten resin is a thermoplastic resin.

15. The injection molding apparatus as recited in claim 14, wherein said thermoplastic resin is polyphenylene sulfide or polymethyl penten.

16. The injection molding apparatus as recited in claim 1, wherein said injection unit and said mold clamp unit are driven by electrically driven servo motor drives.

17. The injection molding apparatus as recited in claim 1, wherein a temperature difference between said injection unit and the clamp mold unit is at least 100° C.

* * * * *